Nov. 21, 1939.  G. GELFAND  2,180,465
PRETZEL STICK PACKAGE
Filed June 5, 1939
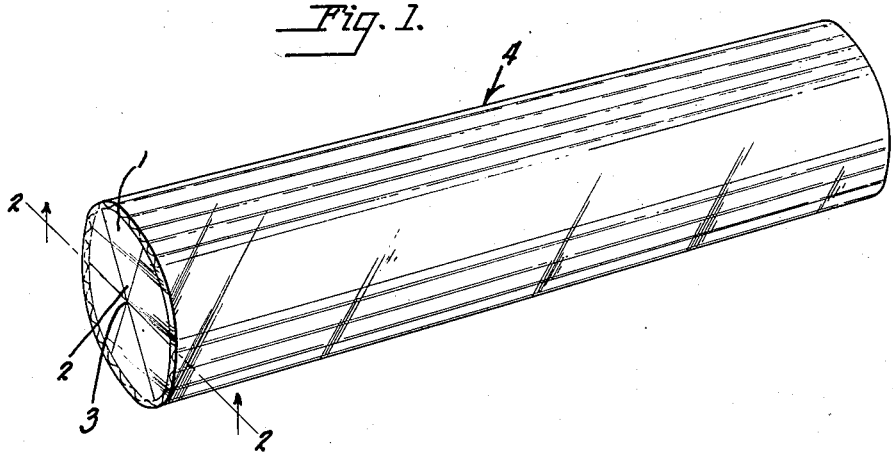
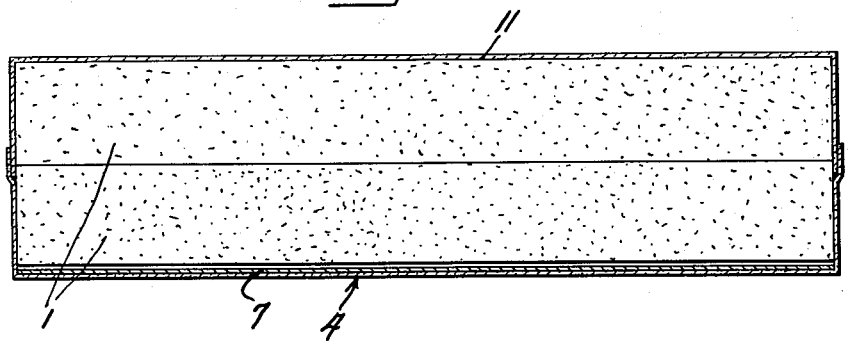
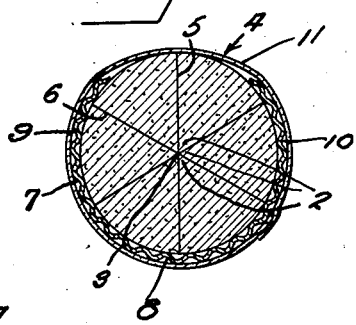
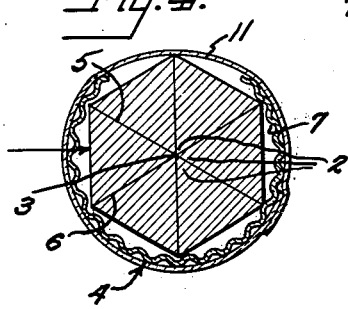
Inventor
*George Gelfand*
By *Mason Fenwick & Lawrence*
Attorneys Patented Nov. 21, 1939

2,180,465

UNITED STATES PATENT OFFICE 2,180,465

PRETZEL STICK PACKAGE

George Gelfand, Wilkes-Barre, Pa.

Application June 5, 1939, Serial No. 277,522

1 Claim. (Cl. 99—172)

This invention relates to a pretzel stick package.

A pretzel stick is a bakery product in elongated form which is extremely brittle and easily shattered, so much so that one rarely encounters a whole pretzel stick.

The conventional pretzel stick is rolled by hand, and when baked is of irregular diameter so that when they are bundled together the pretzel sticks touch only at high spots, leaving unsupported sections which break at the slightest impact. This has deterred the successful packaging of pretzel sticks.

The present invention has for its object the making of the pretzel sticks of uniform cross-section throughout, whereby their contiguous surfaces are planiform, giving them a wedge shape, and arranging them readily with their dihedral apices adjacent the axis of the bundle, and binding them in a wrapper of the girder type in which there is mutual reaction between the wrapper and the bundle of pretzel sticks, the wrapper holding the sticks in compact engagement while the bundle of sticks maintains the girder shape of the wrapper.

The purpose of the invention is to provide a package that will keep the pretzel sticks intact during transportation and while on the shelf.

Other objects of the invention will appear as the following description of a preferred and practical embodiment thereof proceeds.

In the drawing which accompanies and forms a part of the following specification, and throughout the several figures of which the same characters of reference have been employed to designate identical parts:

Figure 1 is a perspective view of the complete pretzel stick package forming the subject of the present invention;

Figure 2 is a diametrical section taken along the line 2—2 of Figure 1;

Figure 3 is a cross-section; and

Figure 4 is a cross-section through a bundle of slightly modified pretzel sticks also illustrating the principle of protection which is inherent in both forms of package.

Referring now in detail to the several figures, the numeral 1 represents a pretzel stick which differs from the conventional pretzel stick in that while the latter is irregular in diameter and knobby in appearance due to the fact that the dough from which it is baked is rolled out by hand, the pretzel stick of the present invention is molded so that its surfaces are planiform throughout, so that when one pretzel stick rests against another there is a mutual surface contact rather than a contact at the high spots alone. While the conventional pretzel sticks are mutually supported at spaced points of contact, leaving unsupported portions in between, the present pretzel sticks when bundled, mutually support one another at every point throughout their extent. Figure 1 shows that the pretzel sticks may be sector-shaped, while Figure 4 shows a modification in which they are triangular in cross-section. In either form, the cross-section has the shape of a wedge, the apices 2 of the dihedral angles forming the wedge being grouped about the axis of the bundle, while the magnitude of the wedge is preferably an even divisor of the whole angle of 360° around the axis of the package.

The pretzel sticks, formed as described or in a similar manner, are grouped about a common axis 3 and are bound together tightly by the wrapper 4. It will be understood that the pretzel stick is quite brittle and breaks under a slight blow, and that the ordinary pretzels of circular cross-section and irregular diameter are not mutually protected by bundling them, for as has been stated, they mutually support one another only at a few separate points, and furthermore, there is no cooperative shock-absorbing reaction between them. In the present invention, no matter how tightly the bundle of pretzel sticks may be bound together by the wrapper, there is still a little give to the bundle when an individual stick is stressed. This is clearly illustrated in Figure 4, in which the arrow represents a blow or other pressure delivered to one of the pretzel sticks. It will be understood that the side surfaces 5 and 6 of the pretzel stick under stress frictionally engage the corresponding surfaces of the adjacent pretzel sticks on each side so that the pretzel stick under stress is buttressed by the adjacent pretzels, the initial impact of the blow being thus sustained by at least three pretzel sticks, the one under direct stress and those which support it, and that the slight give in the package will cause a slippage of the pretzel stick under stress relative to the adjacent pretzel sticks, giving a braking effect which completely absorbs the blow without causing breakage. If the pretzel stick is moved far enough in, in response to the stress, its apical edge will engage the apical edge of the pretzel stick which is diametrically opposite, the latter thus adding further support to the pretzel under stress. It will be understood that the apical edge of the pretzel stick being backed by an ever broadening mass of the pretzel stick, is in the very best possible form and situation to resist breaking.

Thus, I have provided a pretzel stick per se, and also a bundle of pretzel sticks which by the inherent nature of the shape of the pretzel stick, resists breaking. The invention, however, does not stop with the element of the pretzel stick or the bundle of pretzel sticks, but with the combination of the bundle of pretzel sticks with a girder type package. A girder, of course, is a member which resists bending, composed essentially of a web flanked by flanges which extend at an abrupt angle to the plane of the web. The girder package of the present invention consists of a sheet of corrugated board or the like 7, which is bent into a U-form, the base portion 8 of which represents the web and the terminal portions 9 and 10 of which represent the flanges of a girder. Whilever the sheet of corrugated board maintains this shape, it resists bending to a remarkable degree not only because of the longitudinally running corrugations, but because of the general U-shape of the cross-section of this member. When the corrugated sheet member is wrapped about the bundle of pretzel sticks it is maintained in the shape of a girder, and therefore, contributes naturally to the resistance of the bundle of pretzel sticks to being broken. The piece of corrugated sheet material, however, can only be maintained in girder shape by being bound to the bundle of pretzel sticks, and the latter can only be maintained in tight mutual shock-absorbing relationship by being tightly bound together. A thin sheet of material 11, which may be paper, but is preferably of Cellophane or other transparent substance, extends around the sheet of corrugated board as well as around the pretzel stick package, being so secured as to tightly bind the pretzel sticks together and to tightly bind the sheet of corrugated board to the bundle of pretzel sticks.

Thus, we have a special package in which the contents themselves form an indispensable element of the package. The force of a sharp blow directed against one of the pretzel sticks is instantly transmitted to all of the pretzel sticks in the bundle, being completely absorbed through the frictional movement between the contiguous surfaces of the pretzel sticks. More protracted strains are absorbed not only mutually by the pretzel sticks themselves, but by the girder package which resists all bending.

It is, of course, within the contemplation of the invention for the sheet of corrugated board to completely surround the bundle of pretzel sticks. However, it is preferred to have the corrugated board fall short of surrounding the pretzel sticks so that the nature of the package can be readily observed through the Cellophane or other transparent wrapping employed to hold the corrugated board against the bundle of pretzel sticks and to hold the pretzel sticks together.

It will be understood to those skilled in the art that the specific details of my invention as described and illustrated are to be regarded as by way of example, and not to be construed as limiting the scope of the invention defined in the appended claim.

What I claim as my invention is:

Pretzel stick package comprising in combination a bundle of elongated brittle pretzel sticks, each having a wedge-shaped cross-section with the dihedral apices substantially in the axis of the bundle, the contiguous faces of the pretzel sticks being planiform, and a girder wrapper enveloping said bundle of pretzel sticks binding them tightly in said bundle and in turn being itself maintained in girder shape by the bulk of said bundle, said wrapper comprising a U-shaped portion with stiffening corrugations extending longitudinally of the bundle, and a complementary binding portion bridging the space about said bundle between the limbs of said U-shaped portion.

GEORGE GELFAND.